United States Patent
VanDerKamp et al.

(10) Patent No.: US 8,384,730 B1
(45) Date of Patent: Feb. 26, 2013

(54) SYSTEM, MODULE, AND METHOD FOR GENERATING HUD IMAGE DATA FROM SYNTHETIC VISION SYSTEM IMAGE DATA

(75) Inventors: Travis S. VanDerKamp, Marion, IA (US); Daniel Y. Chiew, Marion, IA (US); Jeffrey D. Russell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 847 days.

(21) Appl. No.: 12/286,047

(22) Filed: Sep. 26, 2008

(51) Int. Cl.
*G09G 5/02* (2006.01)
(52) U.S. Cl. ........ 345/581; 340/945; 340/948; 340/951; 348/115; 348/116; 348/117
(58) Field of Classification Search .................. 345/581; 701/2–3; 340/945, 948, 951; 348/115–117
See application file for complete search history.

(56) References Cited

U.S. PATENT DOCUMENTS

| | | | |
|---|---|---|---|
| 5,086,396 A * | 2/1992 | Waruszewski, Jr. .......... | 701/458 |
| 6,591,171 B1 * | 7/2003 | Ammar et al. .................. | 701/16 |
| 7,873,909 B2 * | 1/2011 | Evans ........................... | 715/764 |
| 2006/0227012 A1 * | 10/2006 | He ................................. | 340/945 |
| 2007/0005199 A1 * | 1/2007 | He ................................. | 701/16 |

OTHER PUBLICATIONS

Jarvis J Arthur, III*, Lawrence J Prinzel, III, Lynda J Kramer, Randall E Bailey & Russell V Parrish, "CFIT Prevention Using Synthetic Vision", 2003, from Nasa Technical Reports Server.*

* cited by examiner

*Primary Examiner* — Ke Xiao
*Assistant Examiner* — Kim-Thanh T Tran
(74) *Attorney, Agent, or Firm* — Donna P. Suchy; Daniel M. Barbieri (57) ABSTRACT

A present novel and non-trivial system, apparatus, and method for generating HUD image data from synthetic image data is disclosed. Based on a multi-channel pixel intensity data set generated by a synthetic vision system, a single-channel pixel intensity data set representative of a lighted solid image of terrain comprised of a plurality of intensities of one color may be generated. The single-channel pixel intensity image data set may be determined as a function of multi-channel pixel intensity data set and channel weighting, where channel weighting may be based on sky and/or terrain colors employed by an SVS. Based on the multi-channel pixel intensity data set, a three-dimensional perspective scene outside the aircraft may be presented to the pilot on a HUD combiner. Also, the multi-channel pixel intensity data set may be modified by using at least one chroma key, where such chroma key may be assigned to a specific multi-channel pixel intensity value.

23 Claims, 8 Drawing Sheets

Example of Overhead Installation

Example of Glareshield Installation

SYSTEM, MODULE, AND METHOD FOR GENERATING HUD IMAGE DATA FROM SYNTHETIC VISION SYSTEM IMAGE DATA

BACKGROUND OF THE INVENTION

1. Field of the Invention

This invention pertains to the field of cockpit indicators or head-up display ("HUD") units that provide terrain information to the pilot or flight crew of an aircraft using image data generated by a synthetic vision system ("SVS").

2. Description of the Related Art

Modern avionics systems employ HUD and Head-Down Display ("HDD") indicating systems for providing tactical flight information to the pilot. In a HUD system, a HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot. In a HDD system, a tactical flight display is mounted in the cockpit instrument panel directly in front of the pilot and below windshield level. To view the presentation of information on a display unit of a HDD system, a pilot must look down into the cockpit, causing him or her to take his or her eyes from the outside scene of the aircraft.

Modern avionics systems may employ an SVS for displaying terrain information to both HDD and HUD systems. The SVS system is advantageous in an HDD and HUD indicating system because it presents terrain information of the scene outside the aircraft ("synthetic scene"), thereby enhancing the situational awareness of the pilot. In an HDD system, a lighted solid image of terrain and objects (e.g., obstacles and runways) may be represented on an HDD unit as a realistic, intuitive, three-dimensional perspective using terrain color coding according to elevation that mimics coloring used in aviation-related charts and publications.

U.S. Pat. No. 8,264,498 entitled "System, Apparatus, and Method for Presenting a Monochrome Image of Terrain on a Head-Up Display Unit," which is hereby incorporated by reference in its entirety disclosed a novel and non-trivial system, apparatus, and method for presenting a monochrome, three-dimensional lighted solid image of terrain to the pilot on a HUD unit based upon an image data set comprised of terrain data and color intensity data. Color intensity data could be included in a multi-channel pixel intensity data set.

BRIEF SUMMARY OF THE INVENTION

The embodiments disclosed herein present novel and non-trivial system, apparatus, and method for generating HUD image data from synthetic image data generated by an SVS. The synthetic image data could comprise a multi-channel pixel intensity data set representative of a lighted solid synthetic image which could be converted to a single-channel pixel intensity data set, where such single-channel pixel intensity data set is provided to a HUD system for display of a monochrome, three-dimensional lighted solid image of the synthetic scene on a HUD combiner unit.

In one embodiment, a system is disclosed for generating HUD image data from synthetic image data. The system comprises an SVS for providing synthetic image data, an image generating ("IG") processor, and a HUD system. The IG processor could receive a multi-channel pixel intensity data set and generate a single-channel pixel intensity data set representative of a lighted solid terrain image comprised of a plurality of intensities of one color; the single-channel pixel intensity data set may be generated as a function of the multi-channel pixel intensity data set and channel weighting, where channel weighting may be based on sky and/or terrain colors employed by the SVS. In another embodiment, the multi-channel pixel intensity data set may be modified by using at least one chroma key, where such chroma key may be assigned to a specific multi-channel pixel intensity value. After the image data set has been generated, the IG processor could provide the single-channel pixel intensity data set to a HUD system for displaying an image represented in the data set on a HUD combiner unit.

In another embodiment, a module is disclosed for generating HUD image data from synthetic image data. The module comprises an input communications interface, an IG processor, and an output communications interface. The input communications interface facilitates the receipt of data from at data sources. The IG processor could receive a multi-channel pixel intensity data set and generate a single-channel pixel intensity data set representative of a lighted solid terrain image comprised of a plurality of intensities of one color; the single-channel pixel intensity data set may be generated as a function of the multi-channel pixel intensity data set and channel weighting, where channel weighting may be based on sky and/or terrain colors employed by the SVS. In another embodiment, the multi-channel pixel intensity data set may be modified by using at least one chroma key, where such chroma key may be assigned to a specific multi-channel pixel intensity value. After the image data set has been generated, the IG processor could provide the single-channel pixel intensity data set to a HUD system for displaying an image represented in the data set on a HUD combiner unit.

In another embodiment, a method is disclosed for generating HUD image data from synthetic image data. Multi-channel pixel intensity data set could be received and an image data set could be generated as a function of the multi-channel pixel intensity data set and channel weighting, where channel weighting may be based on sky and/or terrain colors employed by the SVS. In another embodiment, the multi-channel pixel intensity data set may be modified by using at least one chroma key, where such chroma key may be assigned to a specific multi-channel pixel intensity value. Single-channel pixel intensity data set may be provided to a HUD system for displaying an image represented in the data set on a HUD combiner unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
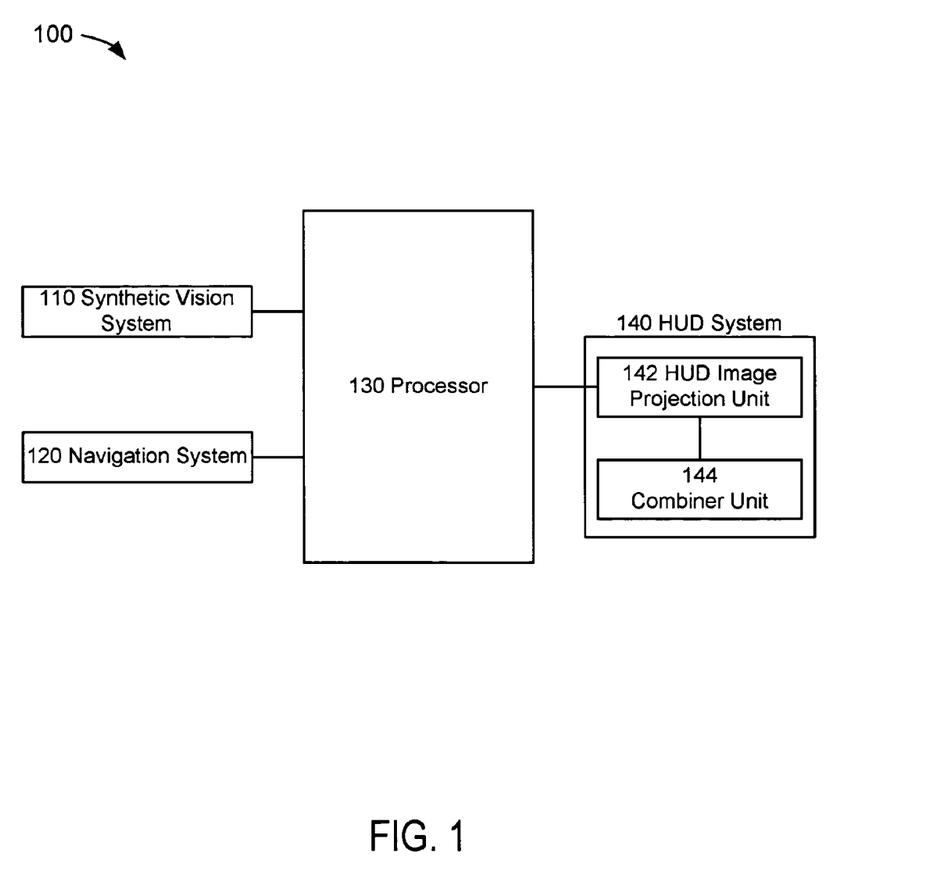
FIG. 1 depicts a block diagram of a HUD image data generating system.

FIG. 1 depicts a block diagram of a HUD image data generating system 100 suitable for implementation of the techniques described herein. The HUD image data generating system 100 of an embodiment of FIG. 1 includes synthetic vision system ("SVS") 110, navigation system 120, an image generating ("IG") processor 130, and a head-up display ("HUD") system 140.

An SVS 110 may generate or produce an image data set (interchangeably, "synthetic scene data" or "synthetic image data") representative of a three-dimensional perspective scene outside of an aircraft (interchangeably, "synthetic scene" or "synthetic image"), where such image could be provided to a display system or display unit of the display system, and the display unit presents an image of the synthetic scene to the pilot. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

In one embodiment, the synthetic scene may include terrain and/or obstacles. In an additional embodiment, the synthetic scene data could include data representative of shading effect and/or texturing effects. As embodied herein, the image data set generated or produced by an SVS 110 could comprise a multi-channel pixel intensity data set, and such multi-channel pixel intensity data could comprise color intensity data. Shading effects and/or texturing effects contained in color intensity data were disclosed in U.S. Pat. No. 8,264,498 entitled "System, Apparatus, and Method for Presenting a Monochrome Image of Terrain on a Head-Up Display Unit" which is hereby incorporated by reference in its entirety.

Location highlighters may address the difficulty of identifying distant objects as disclosed by Yum et al in U.S. Pat. No. 8,094,188 entitled "System, Apparatus, and Method for Enhancing the Image Presented on an Aircraft Display Unit through Location Highlighters" which is hereby incorporated by reference in its entirety. The use of a location highlighter such as a three-dimensional shape can improve a pilot's ability to determine the location of an airport or other object presented on a display unit by enhancing the image presented on an aircraft display unit without interfering with the presentation of flight symbology. Although the disclosed use of location highlighters included the ability to include information within the highlighter, there could be times when displaying such information would interfere with the simultaneous display of flight symbology and a three-dimensional perspective view of terrain.

A synthetic scene may be presented with topographical coloring on a head-down display ("HDD") unit to provide a pilot with a clear and intuitive understanding of the scene outside the aircraft. An HDD is mounted in the cockpit instrument panel directly in front of the pilot and below windshield level. To view the presentation of information on a HDD display unit, a pilot must look down into the cockpit, causing him or her to take his or her eyes from the outside scene of the aircraft.

Different terrain elevations of a synthetic scene may be presented with different colors on an HDD unit, where such colors could correspond to a coloring scheme used on aeronautical charts. For example, the color of the low elevation terrain may be comprised of shades of green, hilly or mountainous terrain may be comprised of shades of brown, and the sky may be comprised of a shade of blue.

A navigation system data 120 may include, but is not limited to, an air/data system, an attitude heading reference system, an inertial guidance system (or inertial reference system), a global navigation satellite system ("GNSS") (or satellite navigation system), and a flight management computing system, all of which are known to those skilled in the art. As embodied herein, a navigation system 110 could provide navigation data including, but not limited to, aircraft position comprising of geographic position and altitude to an IG processor 130 for subsequent processing as discussed herein.

An IG processor 130 could have provided the image data received by a HUD system 140. An IG processor 130 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An IG processor 130 may be driven by the execution of software or computer instruction code containing algorithms developed for the specific functions embodied herein; alternatively, an IG processor 130 may be implemented as an application-specific integrated circuit (ASIC). Common examples of electronic data processing units are microIG processors, Digital Signal IG processors (DSPs), Programmable Logic Devices (PLDs), Programmable Gate Arrays (PGAs), and signal generators; however, for the embodiments herein, the term IG processor is not limited to such processing units and its meaning is not intended to be construed narrowly. For instance, an IG processor could also consist of more than one electronic data processing unit. As embodied herein, an IG processor 130 could be any processor(s) used by or in conjunction with any other system of the aircraft including, but not limited to, a processor of a synthetic vision system 110, a HUD system 140, or any combination thereof.

An IG processor 130 may receive input data from various systems including, but not limited to, a synthetic vision system 110 and a navigation system 120. An IG processor 130 may be electronically coupled to a synthetic vision system 110 and a navigation system 120 to facilitate the receipt of input data; as embodied herein, operatively coupled may be considered as interchangeable with electronically coupled. An IG processor 130 may provide output data to various systems including, but not limited to, an HUD system 140. An IG processor 130 may be electronically coupled to a HUD system 140 to facilitate the providing of output data. It is not necessary that a direct connection be made; instead, such receipt of input data and the providing of output data could be provided through a data bus or through a wireless network. It should be noted that data, as embodied herein for any source or system including a navigation system, could be comprised of any analog or digital signal, either discrete or continuous, which could contain information.

As embodied in FIG. 1, a HUD system 140 may be comprised of a plurality of components including, but not limited to, a HUD image projection unit 142 and a partially transparent and reflective optic commonly referred to as a combiner unit 144. In general, a HUD uses a combination of lenses to create a collimated image. Lens designs that achieve the necessary optical performance tend to be complex and expensive, especially when the FOV is high and the diameter of the lens is large.

Figure 2A:
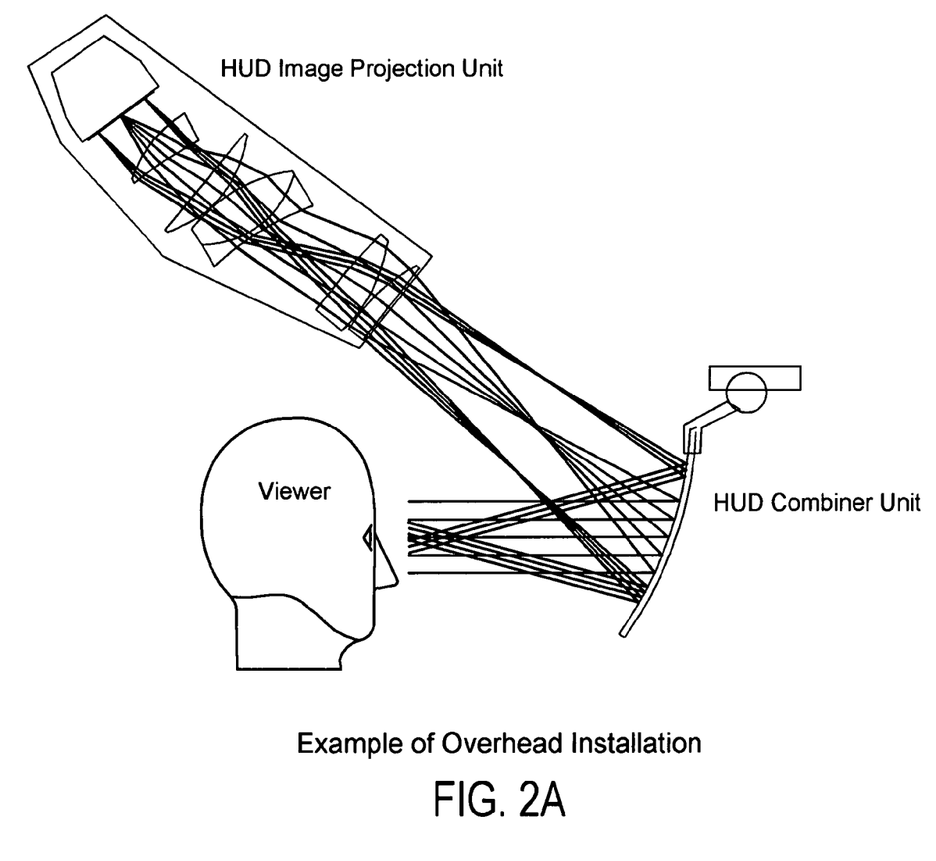
FIG. 2A depicts an example of a typical wide field of view HUD such as found in commercial airliners.
Figure 2B:
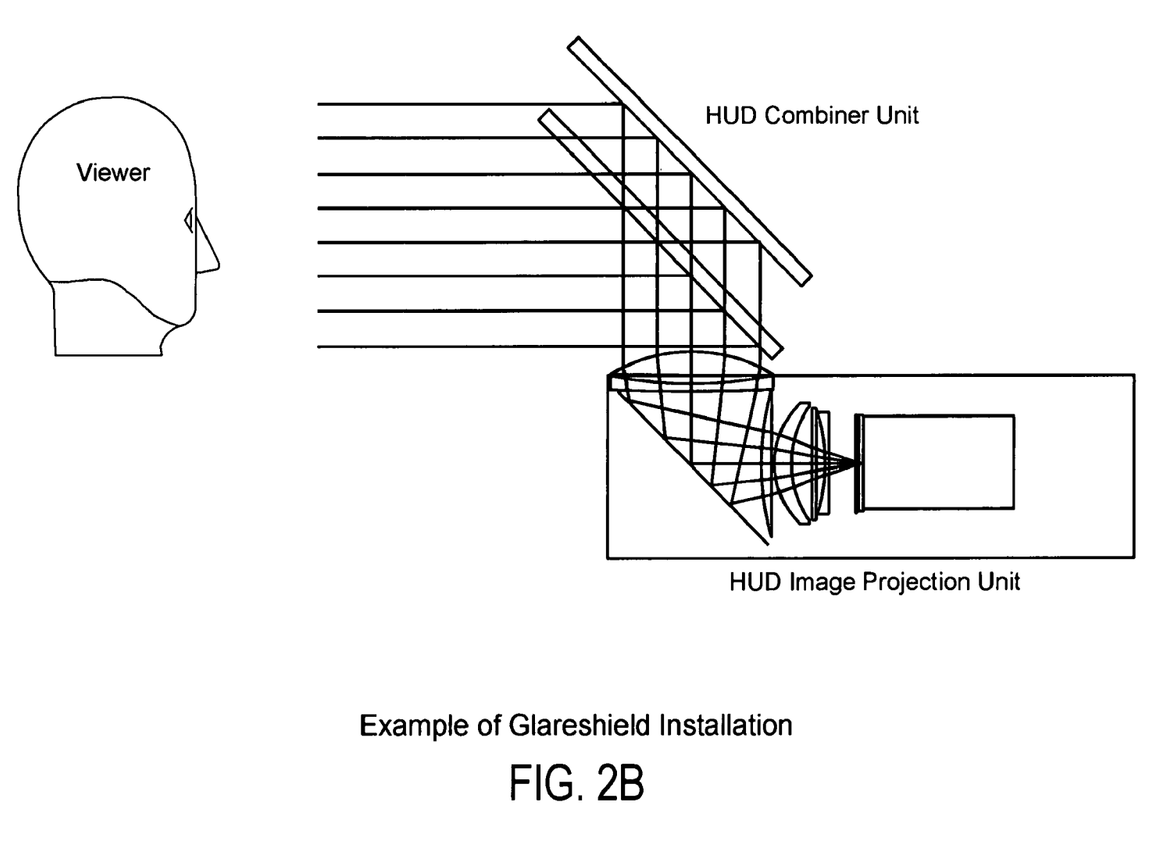
FIG. 2B depicts an example of a typical glareshield mounted HUD such as found in a fighter aircraft.

For the purpose of illustration and not for the purpose of limitation, FIGS. 2A and 2B provide a mere two examples of HUD configurations from the many configurations known to those skilled in the art. For example, FIG. 2A shows an optical layout of a HUD with a wide field of view, which consists of an image projection unit that employs a relay lens assembly mounted over the viewer's head and a combiner unit located forward of the viewer that may be mounted in an aircraft such as a commercial aircraft. As shown, the relay lens assembly is used to form an intermediate image one focal length away from a transparent combiner, which, in turn, functions as a collimating mirror forming collimated beams of light. In another example, FIG. 2B shows a HUD assembly comprised of a HUD image projection unit and combiner unit that may be mounted in the glareshield of an aircraft such as a military fighter aircraft. As shown, beams of light leave a group of field flattening lenses, strike a reflecting mirror or prism, and pass through convex and concave lenses to form collimated beams of light. As shown in the examples of FIGS. 2A and 2B, a typical HUD image projection unit 142 comprises of a complex array of lenses, prisms, and/or mirrors. As embodied herein, a HUD system 140 could comprise any HUD image projection unit 142 which receives optical image input and projects the image onto a combiner unit 144 comprising of one or more combiners.

A combiner unit 144 may be used as a display device used in a HUD system 140. A combiner unit 144 may comprise of one surface as shown in FIG. 2A or a plurality of surfaces as shown in FIG. 2B. A combiner unit could comprise a transparent, world scene while simultaneously viewing information contained in an image reflected toward the viewer by one or more combiners. As a display device, a combiner unit 144 may present tactical flight information and/or a synthetic scene. As embodied herein, tactical flight information displayed on a combiner unit 144 could be information relevant to the instant or immediate control of the aircraft, whether the aircraft is in flight or on the ground. As embodied herein, a combiner unit 144 may depict the synthetic scene as a lighted solid image as disclosed in the U.S. Pat. No. 8,264,498 as discussed above.

Figure 3A:
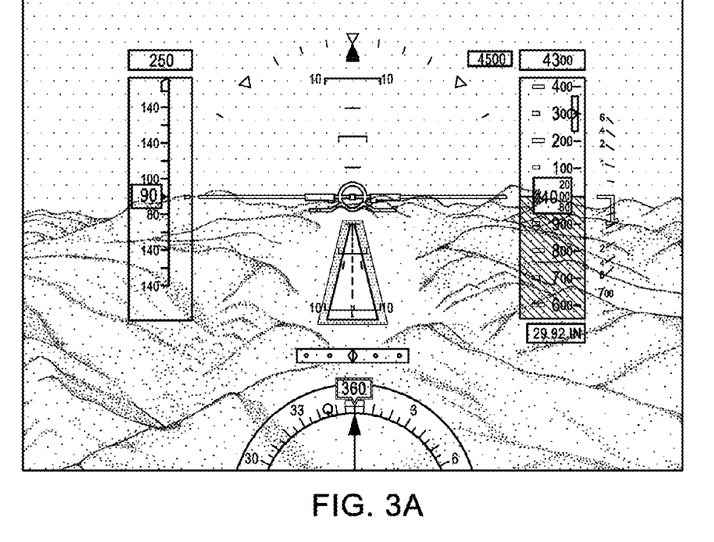
FIG. 3A provides an exemplary illustration of an HDD unit with flight symbology depicted against the background a synthetic scene generated from an RGB color model.

The advantages and benefits of the embodiments discussed herein may be illustrated by showing examples depicting synthetic images that could have been generated or produced by an SVS 110 using a multi-channel color model, where the synthetic image is then depicted after being converted to a single-channel using more than one weighted conversion formulas. FIG. 3A provides an exemplary illustration of an HDD unit with flight symbology depicted against the background a synthetic scene which has a runway in the center of it; the scene in FIG. 3A could be indicative of an aircraft that is flying a final approach to a runway for landing. It should be noted that the symbology depicted on the HDD unit shown in FIG. 3A has been made minimal intentionally for the sake of presentation and is not indicative of the plurality of indications or information with which it may be configured. Because the indications or information shown in FIG. 3A are well-known to those skilled in the art, a discussion of the specific tactical information shown in FIG. 3A is not provided herein.

Figure 3B:
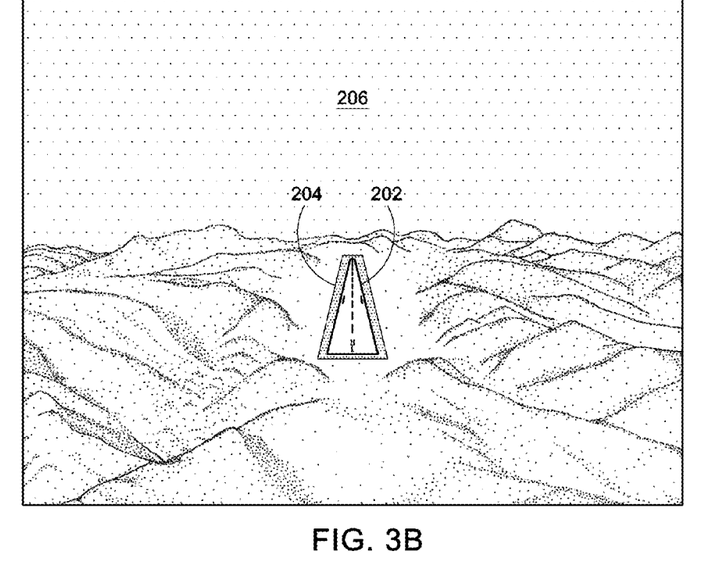
FIG. 3B provides an exemplary illustration of an HDD unit without flight symbology depicted against the background a synthetic scene generated from an RGB color model.

FIG. 3B provides an exemplary illustration of an HDD unit with the synthetic scene of FIG. 3A without the depiction of flight symbology. The same synthetic scene will be used for FIGS. 3C through 3G, inclusive, but a conversion has been made to the right-half of each to illustrate the differences of the synthetic scene converted from a multi-channel color model employing a plurality of channels to a single-channel color model. For the purposes of discussing FIGS. 3C through 3G, inclusive, the colors synthetic image produced by an SVS will be based on the RGB color model having an 8-bit color scale for each channel ranging from 0 to 255. Although the following discussion will be drawn to this specific color model, the embodiments herein are not limited to such color model only but include any color model employing any color scale.

FIG. 3B depicts a runway having a black runway border 202, a magenta location highlighter 204 highlighting the location of the runway, and a sky 206 having the color of "sky blue." For the colors of these three items, the following intensities of the RGB color model of the synthetic scene are the following: black (0, 0, 0), magenta (255, 0, 255) and sky blue (0, 136, 204).

A single-channel color model may be derived by applying weights to each channel of the multi-channel color model to arrive at a weighted sum, where the sum of the weights is one. For example, the Radiocommunication Sector of the International Telecommunications Union ("ITU-R") has published standards for converting a three-channel RGB model to a single-channel grayscale color model. ITU-R Recommendation BT.601 ("BT.601") provides formatting standards for digital television, and ITU-R Recommendation BT.709 ("BT.709") provides formatting standards for high-definition television.

Figure 3C:
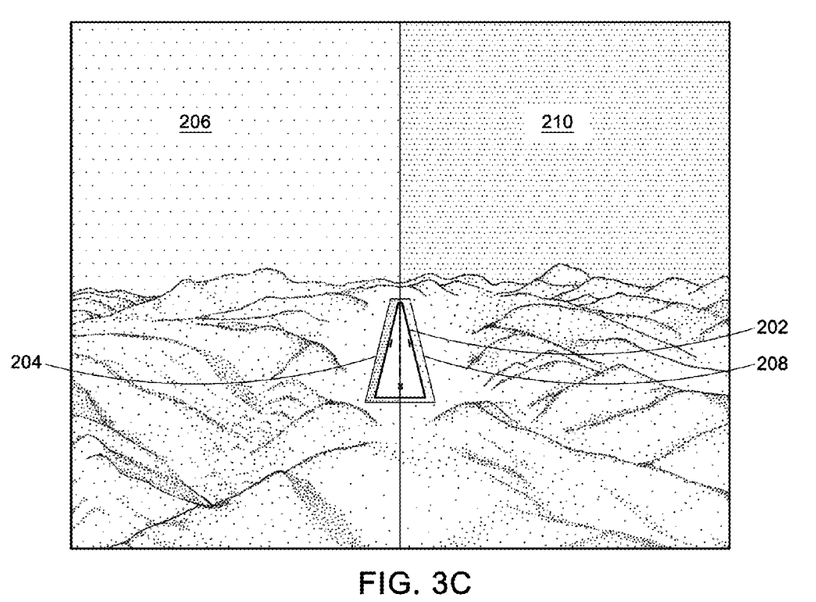
FIG. 3C depicts the synthetic scene of FIG. 3B where the right-half of the image has been converted to a single-channel image using a BT.601 formula.

FIG. 3C depicts the synthetic scene of FIG. 3B, but the RGB color model of the right-half has been modified; the three-channel image has been converted to a single-channel image. To calculate intensity Y of a single-channel grayscale color model from a three-channel RGB color model, BT.601 provides the following formula: $Y=0.299R+0.587G+0.114B$. Here, weights of 29.9%, 58.7%, and 11.4% have been applied to the R-channel, G-channel, and B-channel. Application of the BT.601 formula to colors of the runway border 202, location highlighter 204, and sky 206 of FIG. 3B results with a single intensity for the following colors: black (0), magenta (105), and sky blue (103). In the grayscale color model with a 0-255 channel range, an intensity of 0 is black and an intensity of 255 is white. That is, black indicates 0% intensity, and white indicates 100% intensity; falling between black and white are shades of gray; as embodied herein, black and white may be considered a shades of gray. Accordingly, application of the BT.601 formula results with a single intensity for the following colors (or percent shades of gray): black (0%), magenta (41%), and sky blue (40%). As recognized in FIG. 2C, the shades of gray of location highlighter 208 (41%) and sky 210 (40%) appear with nearly identical. When projected onto a HUD combiner unit, location highlighter 208 and sky 210 could be lighted with approximately the same intensity of HUD monochrome color; and runway border 202 will not be lighted because black is indicative of HUD combiner transparency.

Figure 3D:
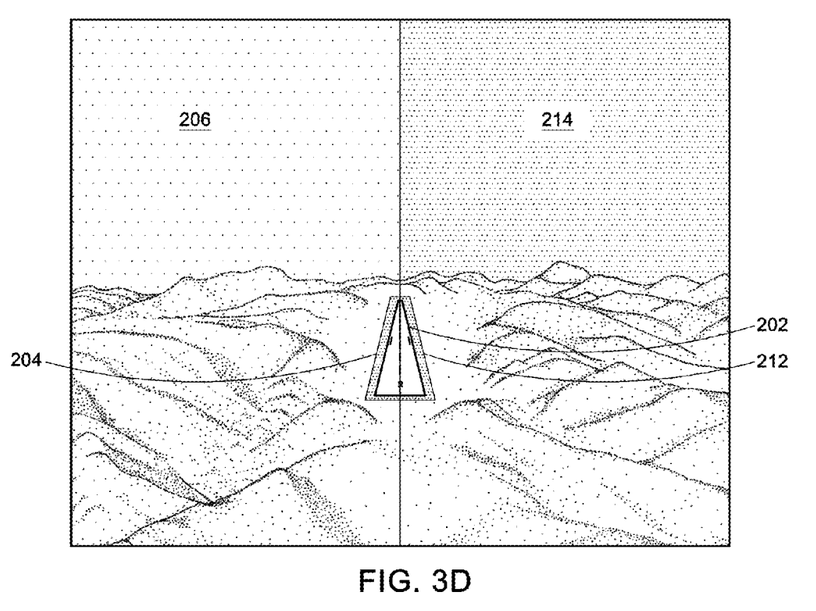
FIG. 3D depicts the synthetic scene of FIG. 3B where the right-half of the image has been converted to a single-channel image using a BT.709 formula.

FIG. 3D depicts the synthetic scene of FIG. 3B, but the RGB color model of the right-half has been modified; the three-channel image has been converted to a single-channel image. To calculate intensity Y of a single-channel grayscale color model from a three-channel RGB color model, BT.709 provides the following formula: Y=0.2125R+0.7154G+0.0721B. Here, weights of 21.25%, 71.54%, and 7.21% have been applied to the R-channel, G-channel, and B-channel. Application of the BT.709 formula to colors of the runway border 202, location highlighter 204, and sky 206 of FIG. 3B results with a single intensity for the following colors: black (0), magenta (73), and sky blue (112). That is, application of the BT.709 formula results with a single intensity for the following shades of gray: black (0%), magenta (28%), and sky blue (44%). As recognized in FIG. 3D, the shades of gray of location highlighter 212 and sky 214 are readily apparent with the sky 214 appearing darker that location highlighter 212. When projected onto a HUD combiner unit, sky 214 could be more lighted than location highlighter 212, and runway border 202 could be transparent.

Figure 3E:
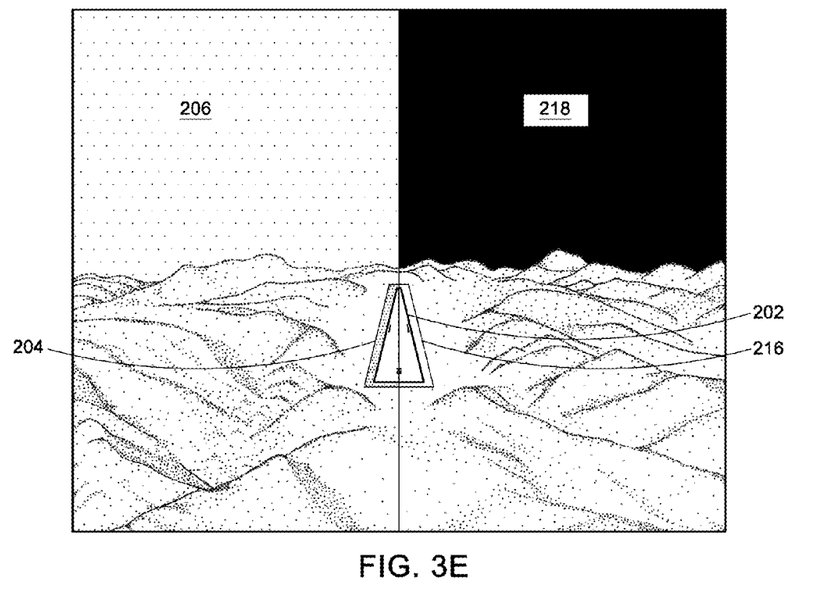
FIG. 3E depicts the synthetic scene of FIG. 3B where the right-half of the image has been converted to a single-channel image using a red-only single-channel color model.

FIG. 3E depicts the synthetic scene of FIG. 3B, but the RGB color model of the right-half has been modified; the three-channel image has been converted to a single-channel image. To calculate intensity Y of a red-only single-channel color model from a three-channel RGB color model, only the primary color red has been extracted; in other words, full weight has been provide to red as indicated in the following formula: Y=1.00R+0.00G+0.00B. Application of this formula to colors of the runway border 202, location highlighter 204, and sky 206 of FIG. 2B results with a single intensity for the following colors: black (0), magenta (255), and sky blue (0). That is, application of the formula results with a single intensity for the following shades of gray: black (0%), magenta (100%), and sky blue (0%). Because 0% intensity indicates black and 100% intensity indicates white, the white of location highlighter 216, and the black of sky 218 and runway 202 of FIG. 3E are easily recognized. When projected onto a HUD combiner unit, location highlighter 212 could be fully lighted, and sky 214 and runway border 202 could be transparent.

Figure 3F:
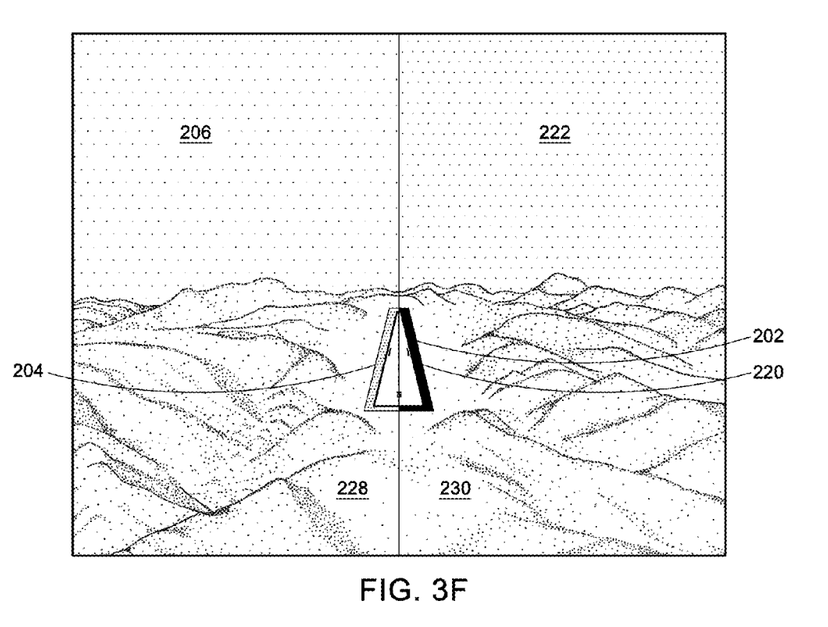
FIG. 3F depicts the synthetic scene of FIG. 3B where the right-half of the image has been converted to a single-channel image using a green-only single-channel color model.

FIG. 3F depicts the synthetic scene of FIG. 3B, but the RGB color model of the right-half has been modified; the three-channel image has been converted to a single-channel image. To calculate intensity Y of a green-only single-channel color model from a three-channel RGB color model, only the primary color green has been extracted; in other words, full weight has been provided to green as indicated in the following formula: Y=0.00R+1.00G+0.00B. Application of this formula to colors of the runway border 202, location highlighter 204, and sky 206 of FIG. 3B results with a single intensity for the following colors: black (0), magenta (0), and sky blue (136). That is, application of the formula results with a single intensity for the following shades of gray: black (0%), magenta (0%), and sky blue (53%). Because 0% intensity indicates black, the black of location highlighter 220 and runway 202, and the approximate medium shade of gray of sky 222 are readily apparent. When projected onto a HUD combiner unit, location highlighter 220 and runway border 202 could be transparent, and sky 222 could be partially lighted (53% lighted).

Figure 3G:
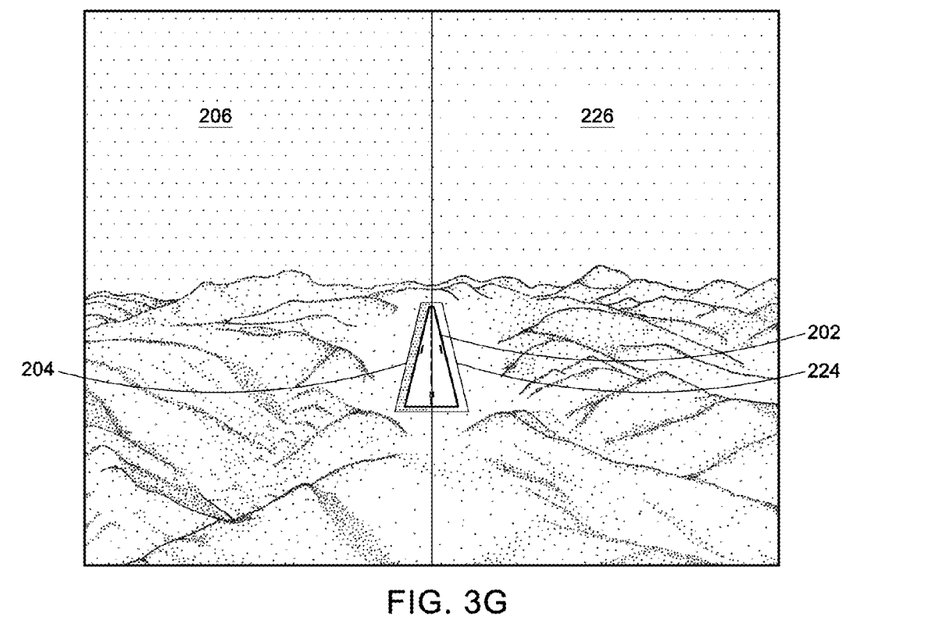
FIG. 3G depicts the synthetic scene of FIG. 3B where the right-half of the image has been converted to a single-channel image using a blue-only single-channel color model.

FIG. 3G depicts the synthetic scene of FIG. 3B, but the RGB color model of the right-half has been modified; the three-channel image has been converted to a single-channel image. To calculate intensity Y of a blue-only single-channel color model from a three-channel RGB color model, only the primary color blue has been extracted; in other words, full weight has been provided to blue as indicated in the following formula: Y=0.00R+0.00G+1.00B. Application of this formula to colors of the runway border 202, location highlighter 204, and sky 206 of FIG. 3B results with a single intensity for the following colors: black (0), magenta (255), and sky blue (204). That is, application of the formula results with a single intensity for the following shades of gray: black (0%), magenta (100%), and sky blue (80%). Because 0% intensity indicates black, 100% indicates white, and 80% intensity indicates a lighter of gray, the white of the location highlighter 216, the white of location highlighter 224, the black of runway 202, and the lighter shade of gray of sky 226 and of FIG. 3E are easily recognized. When projected onto a HUD combiner unit, location highlighter 212 could be fully lighted, sky 214 could be partially lighted (80%), and runway border 202 could be transparent.

In the preceding examples of FIGS. 3B through 3G, inclusive, a single-channel color model has been derived by weighting each channel of the multi-channel color model to arrive at a weighted sum intensity of the single-channel. Through comparison, a red-only color model of FIG. 3E could produce a favorable result in some circumstances. The three-channel color of sky blue (0, 136, 204) of sky 206 has produced a single-channel color of black (0) of sky 218 after full weight has being applied to red. The resultant 0% intensity for the depiction of the sky on a HUD correlates to a favorable, fully transparent image which results with no image being projected onto the combiner unit which may obscure the pilot's vision of the sky in the scene outside of aircraft. Also, a side-by-side comparison of the terrain in FIG. 3E may indicate a more favorable and consistent deception of mountainous terrain with a conversion to a red-only color model. Moreover, a side-by-side comparison of the mountainous terrain in FIG. 3G indicates that a blue-only color model may produce the least favorable depiction of both sky 226 and mountainous terrain.

Although a single-channel color model may provide favorable results in some circumstances, it may not provide such favorable results in others. For example, a green-only color model could produce a more favorable image of lower-lying terrain. A side-by-side comparison of the lower-lying terrain 228 and terrain 230 in FIG. 3F indicates that the synthetic scene converted from the three-channel RGB color model to a green-only color model could produce a more favorable depiction of the lower-lying terrain than that of FIG. 3E. Moreover, a side-by-side comparison of the lower-lying terrain in FIG. 2G indicates that a blue-only color model may produce the least favorable depiction.

Although conversion to a single-channel color model may not produce the most favorable results in all circumstances, chroma keying could be employed to address specific conditions. That is, a chroma key could be employed conditionally. An example of such a condition is with the depiction of the sky. If the sky is represented by the color of sky blue in the generation of the SVS synthetic scene, then a sky blue chroma key could be assigned to the multi-channel pixel intensity corresponding to the color of sky blue. If the sky blue chroma key is matched with the pixel intensity, then the pixel intensity could be modified so that a desired single-channel pixel intensity corresponding to sky blue would result after the application of a conversion formula. Because knowledge of a conversion formula is necessary to achieve the desired single-channel pixel intensity after conversion, the selection of a chroma key may be dependent upon a conversion formula.

Here, sky blue pixel intensity (0, 136, 204) may be modified to a sky blue chroma key (0, 0, 0). Then, upon conversion to a single-channel color model using a conversion formula, the desired 0% intensity represented by the color of black (0)

may result. If the color of sky blue were assigned to depict the sky, then various shade(s) of blue could be used during the creation of the synthetic scene for depicting water such as lakes, rivers, reservoirs, etc. . . . so that a sky blue chroma key would not affect various shades.

Another example of a condition which could employ a chroma key is with the depiction of a runway and runway markings. A resultant 0% intensity for the depiction of a runway and markings on a HUD correlates to a favorable, fully transparent image which results with no image being projected onto the combiner unit which may obscure the pilot's vision of the runway in the scene outside of the aircraft. In other words, the pilot will have a view of the runway unobstructed by a synthetic image.

If specific colors of an RGB color model have been assigned to depict a runway and runway markings in the generation of the SVS synthetic scene, these colors could be represented in a gray scale with a range between and inclusive of white (255, 255, 255) and black (0, 0, 0), where pixel intensity in each channel of a multi-channel color model may equal each other. For example, runway 202 in the drawings of FIG. 3 could employ a white pixel intensity (255, 255, 255) for runway markings, one shade of gray for runway edges (100, 100, 100), and a second shade of gray for the runway center (50, 50, 50). Here, any runway multi-channel pixel intensity in which the pixel intensity for each channel equals each other (x, x, x) may be modified to a runway chroma key (0, 0, 0). That is, a chroma key may be assigned to the specific multi-channel pixel intensity values where the pixel intensity value of each channel equals the other. Then, upon conversion to a single-channel color model using a conversion formula, the desired 0% intensity represented by the color of black (0) may result for the runway and runway markings.

Another example of which a condition which could employ a chroma key is with the depiction of terrain. If specific colors of an RGB color model have been assigned to depict specific elevation ranges in the generation of the SVS synthetic scene, then a specifically-weighted chroma key could be assigned to the pixel intensity of each elevation range to achieve an optimal depiction of terrain; if a specifically-weighted chroma key matches one of the specific RGB pixel intensities, then the pixel intensity could be modified so that a desired single-channel pixel intensity corresponding to the specific color would result after the application of a conversion formula.

In another condition, a chroma key could be based on geographic location where ranges of terrain elevations may be considered in a same category if data representative of aircraft location is provided to an IG processor. For example, terrain elevations in the plains area of the United States between the Appalachian Mountains and Rocky Mountains may be generally categorized as falling within a range of relatively low elevations. If this range is represented by a shade(s) of green in the generation of the SVS synthetic scene, then a weighted chroma key favoring green predominately and red to a lesser extent could be assigned to each multi-channel pixel intensity corresponding to a shade(s) of green. If a weighted chroma key is matched with the pixel intensity, then the pixel intensity could be modified so that a desired single-channel pixel intensity corresponding to the shade of green would result after the application of a conversion formula.

Likewise, terrain elevations in the Rocky Mountains may be generally categorized as falling within a range of relatively high elevations. If this range is represented by a shade(s) of brown in the generation of the SVS synthetic scene, then a weighted chroma key favoring red predominately and green to a lesser extent could be assigned to each multi-channel pixel intensity corresponding to a shade(s) of brown. If a weighted chroma key is matched with the pixel intensity, then the pixel intensity could be modified so that a desired single-channel pixel intensity corresponding to the shade of brown would result after the application of a conversion formula.

Figure 4:
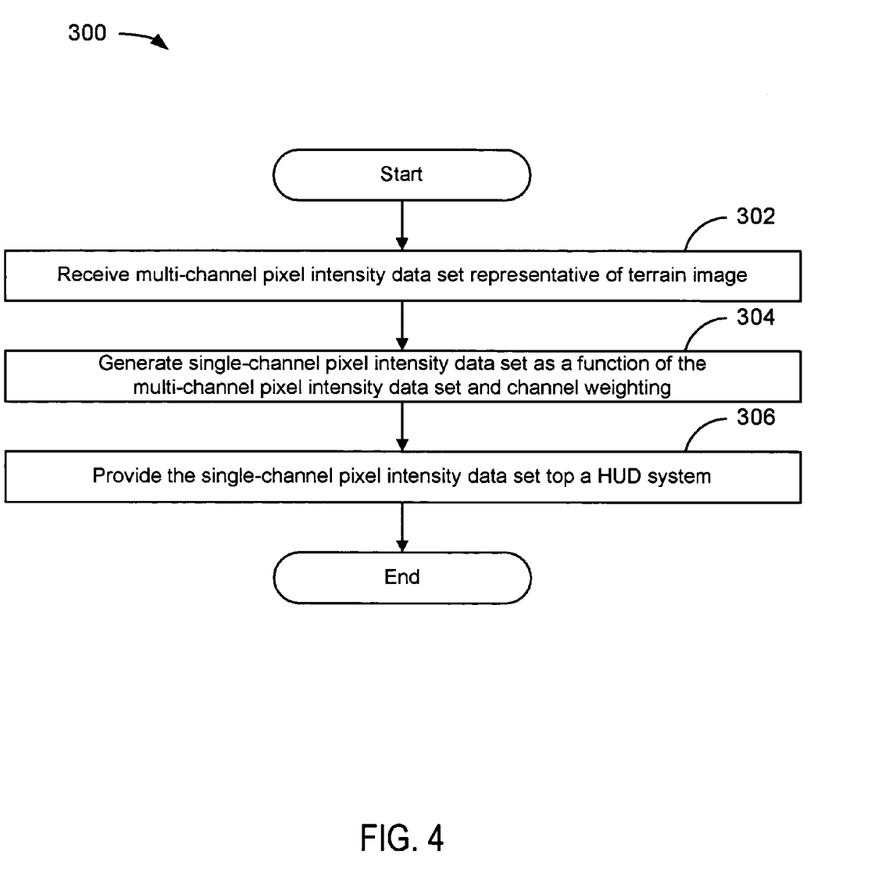
FIG. 4 provides a flowchart illustrating a method for generating HUD image data from synthetic image data.

FIG. 4 depicts a flowchart 300 of an example of a method for generating HUD image data from synthetic image data. The flowchart begins with module 302 with the receiving of multi-channel pixel intensity data by an IG processor 130. As embodied herein, multi-channel pixel intensity data (or color intensity data) could be provide by an SVS 110. In one embodiment, a multi-channel pixel intensity data may be representative of a three-dimensional lighted solid image. In another embodiment, the multi-channel pixel intensity data set could include data representative of at least one location highlighter, shading effect, and/or texturing effect, so that the synthetic image may include at least one of these. As embodied herein, the receiving of data by an IG processor 130 or the providing of data to an IG processor may include a step in which the IG processor performs a retrieval operation of such data.

In an additional embodiment, the multi-channel pixel intensity data could be modified by one or more chroma keys where each chroma key could be assigned to a specific multi-channel pixel intensity value including, but not limited to, a value associated with the color of a sky color, the gray colors of a runway and runway markings, or the color of terrain. In another embodiment, an IG processor 130 could also receive data representative of aircraft position, and each chroma key could have a specific multi-channel pixel intensity value assigned to it.

The flowchart continues with module 304 with the generating of single-channel pixel intensity data as a function of the multi-channel pixel image data set and channel weighting. A multi-channel pixel intensity data set may be converted to a single-channel data set using a weighted conversion formula programmed for use by IG processor 130. As embodied herein, a weight conversion formula could include, but is not limited to, a published formula and/or a formula derived to extract one color channel from a multi-color channel color model. As a result of a conversion, a lighted solid terrain image comprised of a plurality of intensities of a single color may be generated.

The flowchart continues to module 306 with the providing of a single-channel intensity data set to a HUD system for display on a HUD combiner unit of an image data set by an IG processor 130. A single-channel intensity data set could represent a lighted solid image of terrain that is depicted in one color, where changes in terrain elevation or terrain contours or location highlighters may be presented with different color intensities of the same color. As embodied herein, such location highlighters and/or color intensity data may be configurable by a manufacturer or end-user and may include, but are not limited to, data relating to shading effects and texturing effects. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating head-up display ("HUD") image data from synthetic image data, such system comprising:
   a source of a multi-channel pixel intensity data set comprised of synthetic image data representative of a three-dimensional, multi-color perspective of a synthetic terrain image, where
      the synthetic terrain image is being presented on a head-down display ("HDD") unit;
   an image generating processor configured to
      receive a multi-channel pixel intensity data set comprised of the synthetic image data,
      generate a single-channel pixel intensity data set as a function of at least the multi-channel pixel intensity data set and channel weighting, where
         the single-channel pixel intensity data set is representative of a non-wireframe, single color perspective of the synthetic image data, where
            the perspective has the visual appearance of a three-dimensional, lighted solid terrain image formed by varying the brightness of the single color, such that
               changes in terrain elevation are indicated by varied brightnesses of the single color, whereby
                  darker and lighter areas of the three-dimensional, lighted solid terrain image comprised of the varied brightnesses correlate to greater and lesser transparencies of a head-up display unit, respectively, and
      provide the single-channel pixel intensity data set to a HUD system; and
   the HUD system configured to
      receive the single-channel pixel intensity data set, and
      display the perspective of the synthetic image data represented in the single-channel pixel intensity data set on a HUD combiner unit of the HUD system.

2. The system of claim 1, wherein the multi-channel pixel intensity data set includes data representative of at least one location highlighter, shading effect, texturing effect, or a combination thereof, whereby the synthetic image includes at least one of these.

3. The system of claim 1, wherein the processor is incorporated into an existing avionics system.

4. The system of claim 3, wherein the existing avionics system includes a synthetic vision system or the HUD system.

5. The system of claim 1, wherein the image generating processor is further configured to
   modify the multi-channel pixel intensity data set, where
      the multi-channel pixel intensity data set is modified through the use of at least one chroma key.

6. The system of claim 5, wherein each chroma key is assigned to a specific multi-channel pixel intensity value.

7. The system of claim 1, further comprising:
   a navigation system for providing data representative of aircraft position, and
   the image generating processor is further configured to
      receive the data representative of aircraft position, and
      modify the multi-channel pixel intensity data set, where
         the multi-channel pixel intensity data set is modified through the use of at least one chroma key corresponding to aircraft position.

8. The system of claim 7, wherein each chroma key is assigned to a multi-channel pixel intensity value.

9. A module for generating head-up display ("HUD") image data from synthetic image data, such module comprising:
   an input communications interface to facilitate the receiving of data by an image generating processor;
   the image generating processor configured to
      receive a multi-channel pixel intensity data set comprised of synthetic image data representative of a three-dimensional, multi-color perspective of a synthetic terrain image, where
         the synthetic terrain image is being presented on a head-down display ("HDD") unit,
      generate a single-channel pixel intensity data set as a function of at least the multi-channel pixel intensity data set and channel weighting, where the single-channel pixel intensity data set is representative of a non-wireframe, single color perspective of the synthetic image data, where
         the perspective has the visual appearance of a three-dimensional, lighted solid terrain image formed by varying the brightness of the single color, such that changes in terrain elevation are indicated by varied brightnesses of the single color, whereby
            darker and lighter areas of the three-dimensional, lighted solid terrain image comprised of the varied brightnesses correlate to greater and lesser transparencies of a head-up display unit, respectively, and
      provide the single-channel pixel intensity data set to a HUD system; and
   an output communications interface to facilitate the single-channel pixel intensity data set to the HUD system, whereby
      the perspective of the synthetic image data represented in the single-channel pixel intensity data set will be displayed on a HUD combiner unit of the HUD system.

10. The module of claim 9, wherein the multi-channel pixel intensity data set includes data representative of at least one location highlighter, shading effect, texturing effect, or a combination thereof, whereby the synthetic image includes at least one of these.

11. The module of claim 9, wherein the multi-channel pixel intensity data set corresponds to the RGB color model.

12. The module of claim 9, wherein the module is incorporated into an existing avionics system.

13. The module of claim 12, wherein the existing avionics system includes a synthetic vision system or the HUD system.

14. The module of claim 9, wherein the image generating processor is further configured to
   modify the multi-channel pixel intensity data set, where
      the multi-channel pixel intensity data set is modified through the use of at least one chroma key.

15. The module of claim 14, wherein each chroma key is assigned to a specific multi-channel pixel intensity value.

16. The module of claim 9, wherein the image generating processor is further configured to
   receive the data representative of aircraft position, and
   modify the multi-channel pixel intensity data set, where
      the multi-channel pixel intensity data set is modified through the use of at least one chroma key corresponding to aircraft position.

17. The module of claim 16, wherein each chroma key is assigned to a multi-channel pixel intensity value.

18. A method for generating head-up display ("HUD") image data from synthetic image data, such method comprising:
- receiving a multi-channel pixel intensity data set comprised of synthetic image data representative of a three-dimensional, multi-color perspective of a synthetic terrain image, where
  - the synthetic terrain image is being presented on a head-down display ("HDD") unit;
- generating a single-channel pixel intensity data set as a function of at least the multi-channel pixel intensity data set and channel weighting, where
  - the single-channel pixel intensity data set is representative of a non-wireframe, single color perspective of the synthetic image data, where
    - the perspective has the visual appearance of a three-dimensional, lighted solid terrain image formed by varying the brightness of the single color, such that changes in terrain elevation are indicated by varied brightnesses of the single color, whereby darker and lighter areas of the three-dimensional, lighted solid terrain image comprised of the varied brightnesses correlate to greater and lesser transparencies of a head-up display unit, respectively; and
- providing the single-channel pixel intensity data set to a HUD system, whereby
  - the perspective of the synthetic image data represented in the single-channel pixel intensity data set will be displayed on a HUD combiner unit of the HUD system.

19. The method of claim 18, wherein the multi-channel pixel intensity data set includes data representative of at least one location highlighter, shading effect, texturing effect, or a combination thereof, whereby the synthetic image includes at least one of these.

20. The method of claim 18, further comprising:
- modifying of the multi-channel pixel intensity data set, where the multi-channel pixel intensity data set is modified through the use of at least one chroma key.

21. The method of claim 20, wherein each chroma key is assigned to a specific multi-channel pixel intensity value.

22. The method of claim 18, further comprising:
- receiving data representative of aircraft position, and
- modifying the multi-channel pixel intensity data set, where the multi-channel pixel intensity data set is modified through the use of at least one chroma key corresponding to aircraft position.

23. The method of claim 22, wherein each chroma key is assigned to a multi-channel pixel intensity value.

* * * * *